United States Patent [19]
Anderson

[11] Patent Number: 6,042,081
[45] Date of Patent: Mar. 28, 2000

[54] DIAPHRAGM OPERATED PROCESS FLOW VALVE

[75] Inventor: R. David Anderson, Wichita Falls, Tex.

[73] Assignee: Anderson Controls, LC, Wichita Falls, Tex.

[21] Appl. No.: 09/222,032

[22] Filed: Dec. 29, 1998

[51] Int. Cl.$^7$ .................................................. F16K 31/126
[52] U.S. Cl. ........................ 251/61.5; 137/1; 251/61.2; 251/337
[58] Field of Search ..................... 251/337, 336, 251/61.2, 61.3, 61.5; 137/524, 1

[56] References Cited

U.S. PATENT DOCUMENTS

| | | | |
|---|---|---|---|
| 1,145,671 | 7/1915 | Butcher | 251/61.5 |
| 1,288,821 | 12/1918 | Broderick | 137/524 |
| 2,230,718 | 2/1941 | Gannestad | 251/61.5 |
| 2,665,711 | 1/1954 | Parks | 251/61.5 |
| 3,428,063 | 2/1969 | Plotkin et al. | 137/45 |
| 4,098,487 | 7/1978 | Bauer | 251/61.4 |
| 4,135,697 | 1/1979 | Brumm | 251/61.3 X |
| 4,309,022 | 1/1982 | Reinicke et al. | 251/61.4 |
| 5,392,807 | 2/1995 | Caudle et al. | 251/61.5 X |

*Primary Examiner*—Stephen M. Hepperle
*Assistant Examiner*—John Bastianelli
*Attorney, Agent, or Firm*—Charles D. Gunter, Jr.

[57] ABSTRACT

The present invention is directed towards a diaphragm actuator valve with a keeper element for controlling the number of active coils in the actuator spring, thus controlling the spring tension. The apparatus is a diaphragm operated process flow valve, the valve comprising a valve body and an actuator. The valve body is made up of a valve stem, a valve plug, and the valve seat. The actuator is made up of a diaphragm element operatively associated with a valve stem, which in turn engages the valve plug and seat. An actuator spring having a plurality of spring coils is used to apply pressure against the diaphragm and valve plug. The actuator spring has a terminal coil adjacent to the diaphragm, and the diaphragm acts upon the valve stem against or with the pressure of the spring depending on how the spring is configured. A housing with an internal profile surrounds the spring. The internal profile is used for locating a keeper element at various positions within the housing, engaging the spring at a chosen position. The location of the keeper element is chosen to adjust the spring sensitivity, which in turn adjusts the sensitivity of controlling the valve plug against the valve seat.

16 Claims, 3 Drawing Sheets

DIAPHRAGM OPERATED PROCESS FLOW VALVE

BACKGROUND OF THE INVENTION

1. Field of the Invention

The present invention relates in general to diaphragm actuator valves, and more particularly to an adjustable actuator spring associated with the diaphragm actuator valve. Still more particularly, this invention relates to an adjustable keeper element that is used in conjunction with the actuator spring to adjust the tension on the valve.

2. Description of the Prior Art

Valve control devices are vital to many industries, in particular to the oil and gas industry where large volumes of fluid or gas under varying pressures must be controlled through pipelines. Diaphragm actuator valve devices are the most common valve control devices used. These devises employ a flexible pressure responsive element as a diaphragm. The diaphragm is typically sandwiched between two halves of a housing, creating an open space above and below the diaphragm. An actuator stem or plunger stem extends from the diaphragm, being associated with the diaphragm in such a way as to move up or down relative to the movement of the flexible diaphragm.

The diaphragm can be controlled by controlling the pressure on either side of the diaphragm. By increasing the pressure in the space above the housing a direct-acting actuator is created. By controlling the pressure below the diaphragm a reverse-acting actuator is created. In either case, a compression spring, or actuator spring, is used to create tension between the diaphragm's movement and the movement of the valve plug coupled to the end of the plunger stem. A pneumatic signal operates upon the diaphragm to cause the plunger stem to open and close the valve plug, thus controlling liquid or gas flow through a pipe. Control of the valve plug against the valve seat is vital in maintaining adequate control of fluid flow through a pipe. Some examples of this type of valve control device are Plotkin et al. (U.S. Pat. No. 3,428,063), and Bauer (U.S. Pat. No. 4,098,487).

One of the problems of these types of valve control devices is in adapting the device to control the large range of pressures encountered. Simply specifying a valve size to match an existing pipeline size leaves much to chance and will likely create an impractical situation in terms of adequate control. A valve which is too small will not pass the required amount of flow. A valve that is too large will be unnecessarily expensive and may create instability problems as it attempts to control very low increments of plunger travel. In the past, these types of valves have been fine tuned for the specific intended application by changing out the valve plug and/or valve seat.

One invention is directed towards a means of adjusting the pressure exerted on the valve plug and valve seat. Reinicke et al. (U.S. Pat. No. 4,309,022) disclose a valve that applies a high force to the valve plug momentarily to seat the plug, then a lower pressure to maintain the seating. This invention is primarily directed towards improving the long-term usefulness of valve plugs and valve seats that otherwise become damaged due to creeping of the valve seat and plug material under pressure.

An alternative to controlling the tension on the valve plug and valve seat is to adjust the actuator spring tension. This is presently accomplished by one of two methods. The first is adjusting a spring adjustor attached to the bottom end of the spring, forcing it either up against the diaphragm or away from the diaphragm. The second is by replacing the spring with a spring of the desired tension. The first method offers only very small changes in tension control, while the second is cumbersome and time consuming. A device that could control the sensitivity of the valve, thus adapting to various changes in liquid flow and pressure, is desirable.

SUMMARY OF THE INVENTION

An object of the present invention is to provide a method and apparatus for controlling fluid flow through a pipe.

Another object of the present invention is to provide a means of controlling the sensitivity of the valve plug in a valve control device by adjusting the tension in the spring.

Another object of the present invention is to provide a means of activating and deactivating the coils of the actuator spring on a diaphragm actuated control valve.

The foregoing objects are achieved by the present apparatus and method. The apparatus is a diaphragm operated process flow valve, the valve comprising a valve body and an actuator. The valve body is made up of a valve stem, a valve plug, and the valve seat. The actuator is made up of a diaphragm element operatively associated with a valve stem, which in turn engages the valve plug and seat. An actuator spring having a plurality of spring coils is used to apply pressure against the diaphragm and valve plug. The actuator spring has a terminal coil adjacent to the diaphragm, and the diaphragm acts upon the valve stem against or with the pressure of the spring depending on how the spring is configured.

A housing with an internal profile surrounds the spring. The internal profile is used for locating a keeper element at various positions within the housing, engaging the spring at a chosen position. The location of the keeper element is chosen to adjust the spring sensitivity, which in turn adjusts the sensitivity of controlling the valve plug against the valve seat.

Additional objects, features and advantages will be apparent in the written description which follows.

DETAILED DESCRIPTION OF THE INVENTION

Figure 1:
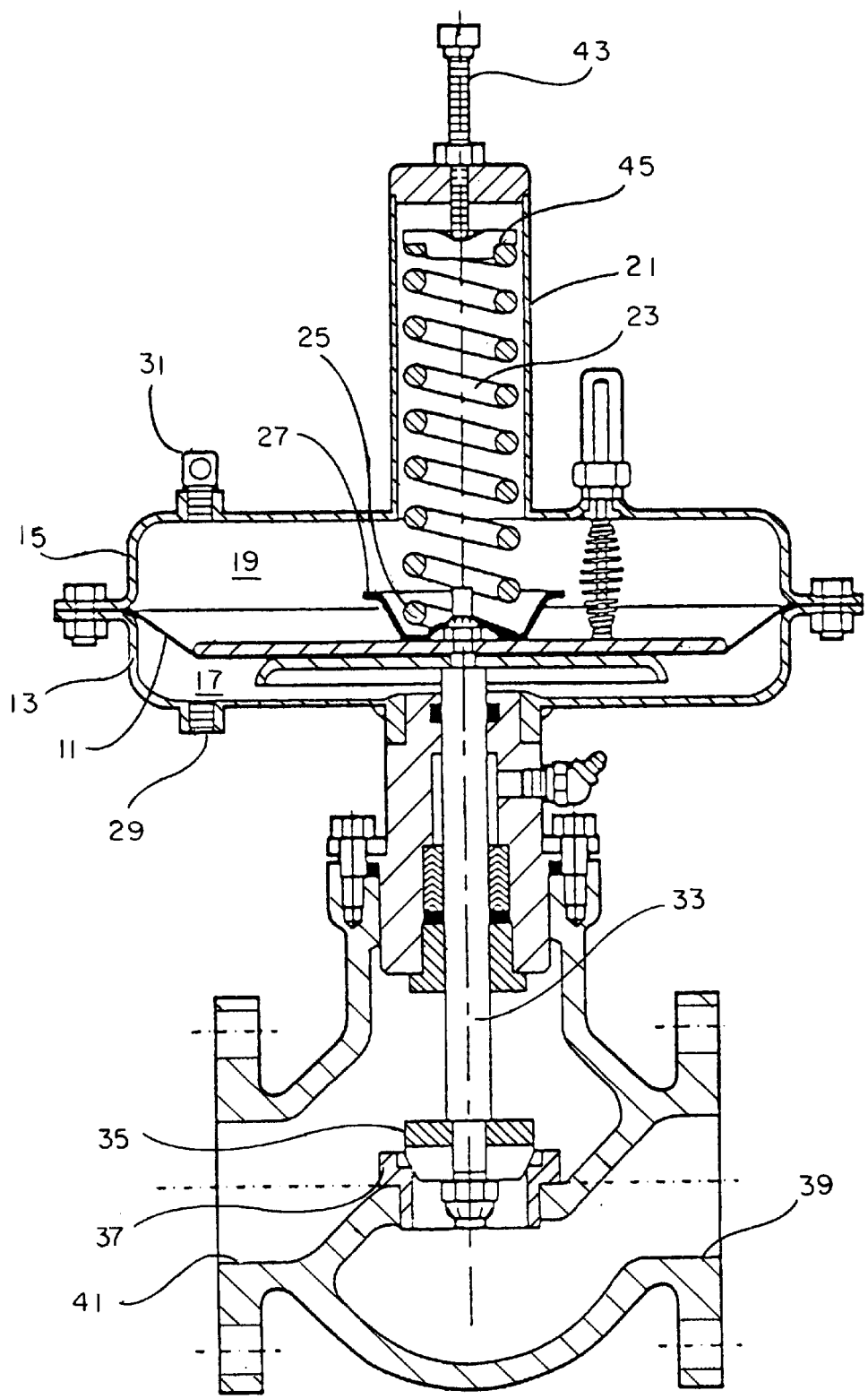
FIG. 1 is a diagram of a prior art diaphragm actuator.

Referring to FIG. 1, a drawing of the prior art is discussed to show the relevant features of a diaphragm actuator valve control device. The diaphragm 11 is located within the two housing halves 13 and 15, forming chambers 17 and 19. The spring housing 21 is associated with the diaphragm housing half 15, and actuator spring 23, a compression spring, is contained within the housing 21. The bottom spring coil 25 is associated with diaphragm plate 27, which is in turn associated with the diaphragm 11.

Movement of the diaphragm can be controlled by either increasing and decreasing the pressure within chamber 17, or by the same within chamber 19. The pressure within chamber 17 is controlled pneumatically through the loading pressure stem 29, while pressure in chamber 19 is controlled pneumatically through the loading pressure stem 31. Pneumatically operated control valve actuators are the most commonly used type of valve control devices, being highly dependable and having a simple design lending itself to ease of use.

Associated with the diaphragm 11 is valve stem 33. The movement of the valve stem is an up or down motion perpendicular to the central axis of the spring and spring housing, drawing the valve plug 35 into and out of the valve seat 37. This controls the flow of fluid through the valve inlet 39 and outlet 41. The up and down movement of the valve stem is controlled by movement of the diaphragm 11 either up or down, depending on the pneumatic pressure applied in either chamber 17 or 19. In turn, actuator spring 23 exerts tension against the diaphragm and valve stem in the valve plug. Thus, the spring 23 might force the valve plug 35 against the valve seat 37 in its rest position, and pressure applied to chamber 17 would force the diaphragm up, which would push the spring up and force the valve stem 33 up, unseating the valve plug from the valve seat.

Choosing the size of valve plug and valve seat necessary for a given operation can be approximated by determining the valve sizing coefficient ($C_v$) for the given conditions. Then a valve with the defined $C_v$ can be chosen for the application. $C_v$ is found using the following equation:

$$C_v = Q(G/\Delta P)^{1/2}$$

where Q is the capacity in gallons per minute, G is the specific gravity of the fluid to be controlled through the valve, and $\Delta P$ is the pressure differential in psi. The $C_v$ value is numerically equal to the number of U.S. gallons of water at 60° F. (ca 15.5° C.) that will flow through the valve in one minute when the pressure differential across the valve is one pound per square inch. The $C_v$ can vary with both the size of the valve and the shape and materials it is manufactured from. By using standard testing procedures, the $C_v$ value of various valves can be determined.

To get a more exact determination of what type of valve is needed, fluid viscosity for a given operation must be taken into account. By using a standard graph of Reynolds number vs. viscosity common in the art, the correction can be easily determined as the value $F_v$. Using the following equation will lead to the viscosity corrected valve sizing coefficient:

$$C_{vr} = F_v C_v$$

where $C_{vr}$ is the actual required valve sizing coefficient. As can be seen from the equations above, it can be difficult to determine what type of valve is needed in a given operation. Further, a change in the capacity (G) directly effects the type of valve that is necessary. Thus, it may be necessary to change out the valve plug, valve seat, or both from one operation to the next unless another means of controlling the fluid flow is used, such as controlling the tension in the actuator spring 23.

A spring adjustor 43 can be used to control the tension of the spring 23 as shown in prior art FIG. 1. This is accomplished by turning the adjustor 43 either clockwise or counterclockwise to push the spring seat 45 down onto the spring, or lift the seat up from the spring. This variation in pressure from the spring seat 45 translated from adjustor 43 changes the force on the spring, hence, the tension exerted on the diaphragm 11. Changing this tension alters the force necessary to move the valve stem 33 up and down. However, this technique offers only very small changes in the spring tension. being movable by only one to two inches up or down.

Figure 2:
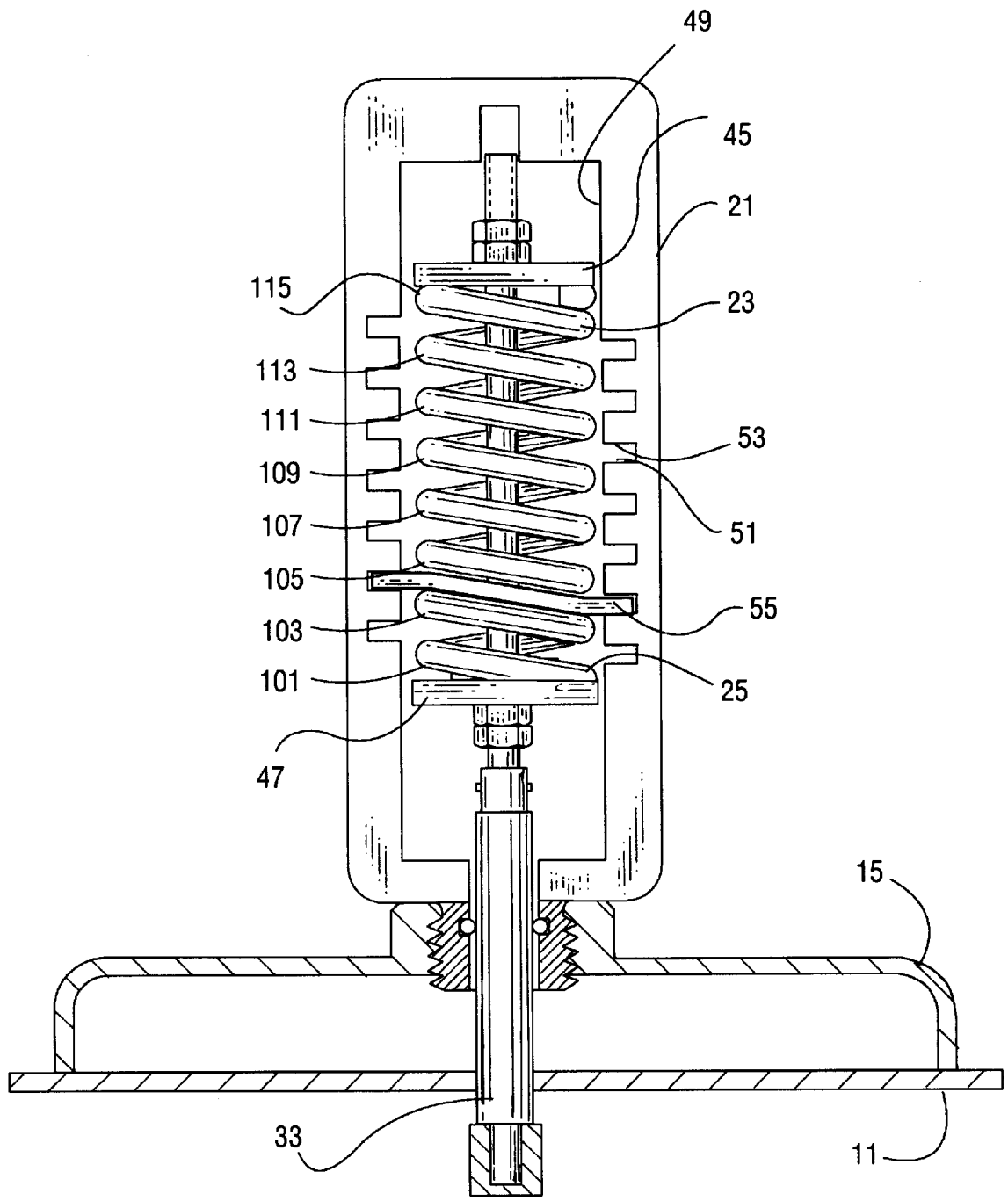
FIG. 2 is a cut-away diagram of one embodiment of the invention showing the actuator spring and housing.
Figure 3:
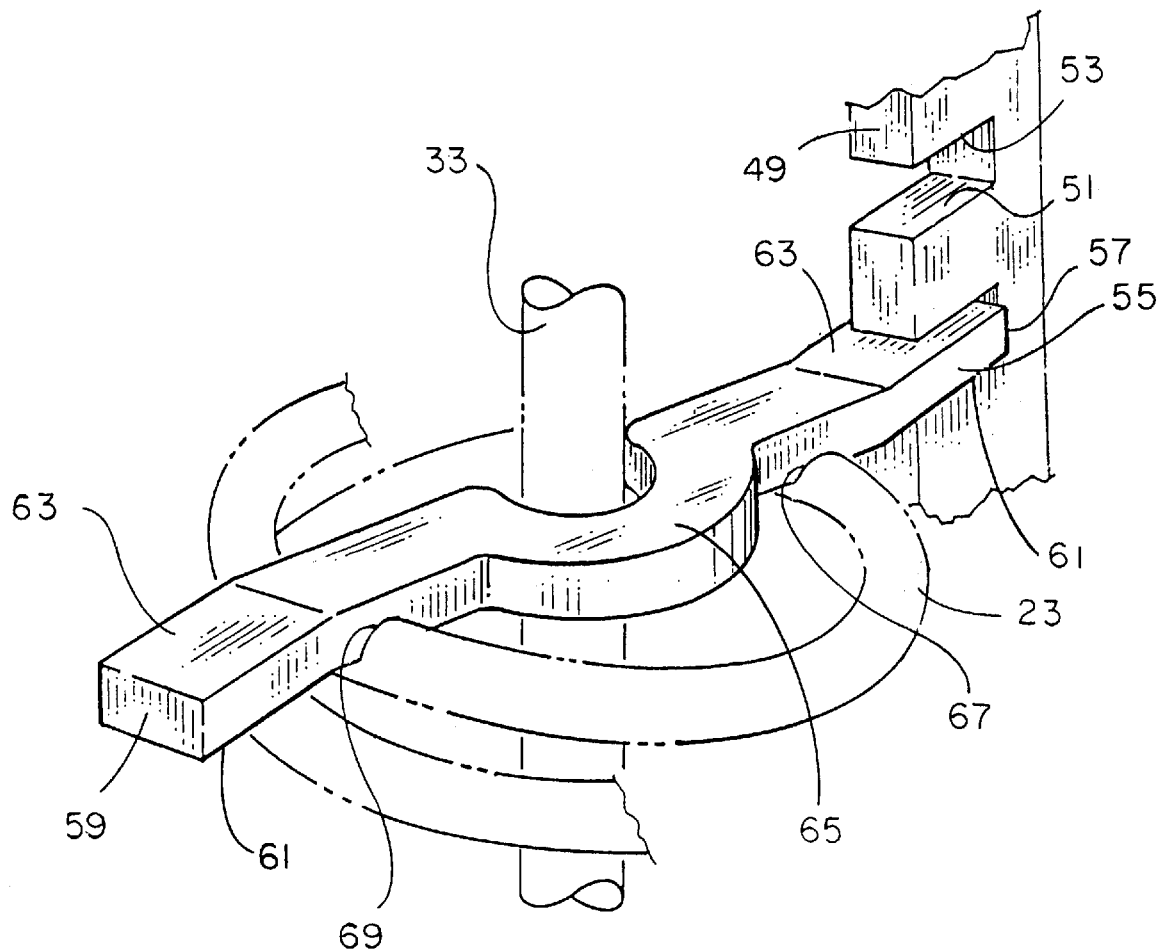
FIG. 3 is a close-up view of the adjustable keeper element within the spring housing and against a spring coil.

Altering the number of active coils in the actuator spring is an improved method of controlling the spring tension, as is show in FIG. 2 and FIG. 3. FIG. 2 shows a cut-away view of one possible embodiment of the present invention. In FIG. 2, diaphragm 11 is associated with the actuator spring 23 through valve stem 33, which runs through the spring. Spring 23 is seated on spring seat 47 at the bottom coil 25, and at the top on spring seat 45. The spring is contained in housing 21 having a plurality of threads set within the inner wall 49. Each thread is defined by a lower lip 51 and upper lip 53. The threads correspond to one another on each side of the housing in opposition to one another in this embodiment, and offset from a plane perpendicular to the valve stem 33.

The adjustable keeper element 55 is located between two opposing, offset threads. The threads are offset such that the keeper element 55 is at the same angle as the spring 23 in its resting position. The keeper element thus positioned deactivates the spring coils above the element, allowing only the coils below the element to be active. Thus, in FIG. 2, only coil 101 is active, while coil 103 rests upon the keeper element 55. Coil elements 105–115 are inactive.

Controlling the spring tension is vital in controlling fluid flow through the valve plug and valve seat. The spring tension in turn determines the amount of force necessary to move the valve stem and valve plug within the valve seat, thus controlling flow. The force (F) necessary is equivalent to the distance the spring must move (x), multiplied by a force constant (k) as in the equation:

$$F = -kx$$

The force constant (k) is dependent on a number of factors including the total length of the spring, the strength of the material it is made from, the diameter of the coil, the radius of the winding of the spring coil, and the number of active coils. Thus, controlling one of these factors directly influences how much force is necessary to move the spring distance (x).

The keeper element 55 can be moved up or down the length of the valve stem 33 to selectively activate or deactivate certain coils in the spring. Depending upon the position of the keeper element 55, 8 coils may be active, 5 coils may be active, or any other number of coils between 8 and 1 in FIG. 2. Changing the spring tension, in effect, changes the force needed to open the valve seat. Assuming a 3–15 psi signal pressure to the valve plug, 10 active coils cause the valve stem 33 to move 1 inch in a ¾ inch diameter valve seat. For the same signal pressure, 5 active coils cause the rod to move ½ inch in a ¾ inch seat. For the same signal pressure with 1 active coil, the rod moves 0.1 inch in a ¾ inch seat.

FIG. 3 shows a close-up drawing of one embodiment of the present invention. Although the keeper element 55 in this figure is shown as a two ended bar, it is to be understood by those skilled in the art that other configurations would also serve the same purpose of the invention. The keeper element 55 has a first end 57 and a second end 59 that are associated with the threads set into the housing 49. Both the first and second ends of keeper element 55 have a bottom edge 61 and top edge 63. The first and second ends rest in the thread (only the first end resting in the thread is shown), with the bottom edge 61 of the keeper element resting on the lower lip 51 when the spring pressure is applied from above the keeper element downward. Top edge 63 of the keeper element will contact the upper lip 53 of the thread when pressure is applied from below the keeper element upward. There is a bow region 65 in the keeper element that allows a space for the movement of valve stem 33 up and down between the spring 23.

In the embodiment shown in FIG. 3, the keeper element contacts the spring 23 at two locations designated at 67 and 69. These locations are contacted when pressure from the spring is applied upward against the keeper element, with the first 57 and second 59 ends of the keeper element 55 held within the thread. In the configuration of FIG. 3, upper lip 53 is contacted by the top edge 63 of the keeper element at the first 57 (shown) and second 59 ends.

This invention has several advantages. The keeper element and housing of the invention can be made from aluminum, thus easy and economical to manufacture. Further, using the invention is also simple and affordable, avoiding the need for purchasing expensive valve plugs and valve seats. Also, the simplicity of the design allows for convenient use.

Another advantage of the present invention is the greater flexibility it allows for use in various flow conditions. For example, whereas with prior art devices the valve plug and valve seat needed to be replaced when exposed to drastically different flow conditions (see ΔP above), the new invention allows for a simple, quick change in the keeper element within the housing to adjust the spring tension. Changing the tension in the spring adapts the valve plug, which acts through the valve stem, to new conditions in flow and/or pressure.

Finally, the range and flexibility of the present invention greatly exceeds past methods of altering the spring tension. By repositioning the keeper element of the present invention, dramatic change in the force required to move the spring is accomplished. Thus, the present invention increases both the flexibility of a diaphragm actuator valve system and the sensitivity of controlling fluid flow through a pipe.

While the invention has been shown in only one of its forms, it is not thus limited but is susceptible to various changes and modifications without departing from the spirit thereof.

What is claimed is:

1. A diaphragm operated process flow valve, the valve comprising:

a valve body assembly having an inlet, an outlet, and a valve seat;

a valve plug for engaging the valve seat and controlling flow between the inlet and outlet;

a valve stem coupled to the valve plug, the valve stem extending up through the valve body;

an actuator having a diaphragm element operatively associated with the valve stem;

an actuator spring having a plurality of active spring coils, the terminal coil adjacent to the diaphragm contacting the diaphragm for varying the opening resistance of the plunger element in the valve seat;

a housing surrounding the actuator spring having an internal profile; and a keeper element positionable within the internal profile at selected locations and engageable with the actuator spring to vary the number of active coils of the spring.

2. The apparatus of claim 1, wherein the internal profile of the housing comprises of at least one pair of threads set within the housing, each thread having a lower and an upper lip.

3. The apparatus of claim 2, wherein the keeper element is a rigid structure with at least a first end and a second end, the first and second ends being operatively associated with the threads set within the housing.

4. The apparatus of claim 3, wherein the first and second ends of the keeper element have a top edge and a bottom edge, the top edge making contact with the upper lip of the thread when force is applied on the spring from below the keeper element, and the bottom edge making contact with the lower lip when force is applied on the spring from above the keeper element.

5. The apparatus of claim 4, wherein the at least one pair of threads is offset at an angle comparable to the angle of the spring coil at rest so that the keeper element makes contact with the spring coil at the at least two positions.

6. The apparatus of claim 1, wherein positioning the keeper element closer to the diaphragm increases the spring tension.

7. The apparatus of claim 3, wherein the keeper element is a rigid bar with opposing first and second ends for contacting the internal profile of the housing at opposing sides.

8. The apparatus of claim 7, wherein the keeper element has a bow region at the center to create an area to allow the plunger element to move freely.

9. The apparatus of claim 1, wherein the position of the keeper element within the internal profile is chosen to adjust the tension of the spring.

10. A method of controlling the flow through a pipe using a diaphragm operated process flow valve, the method of flow control comprising:

providing a valve body assembly having an inlet, an outlet, and a valve seat;

providing a valve plug for engaging the valve seat and controlling flow between the inlet and outlet; providing a valve stem coupled to a valve plug, the valve stem extending up through the valve body;

providing an actuator having a diaphragm element operatively associated with the valve stem;

providing an actuator spring having a plurality of active spring coils, the terminal coil adjacent to the diaphragm contacting the diaphragm for varying the opening resistance of the plunger element in the valve seat;

providing a housing surrounding the actuator spring having an in tern al profile;

providing a keeper element positionable within the internal profile at selected locations and engageable with the actuator spring to vary the number of active coils of the spring; and adjusting the sensitivity of the spring by engaging a selected coil of the spring with the keeper element through placement of the keeper element at a selected location within the internal profile of the housing.

11. The method of claim 10, wherein the internal profile of the upper housing comprises of at least one pair of threads set within the housing, each thread having a lower and an upper lip.

12. The method of claim 11, wherein the keeper element is a rigid structure with at least a first end and a second end, first and second ends being operatively associated with the threads set within the housing.

13. The method of claim 12, wherein the first and second ends of the keeper element have a top edge and a bottom edge, the top edge making contact with the upper lip of the thread when force is applied on the spring from below the keeper element, and the bottom edge making contact with the lower lip when force is applied on the spring from above the keeper element.

14. The method of claim 13, wherein the at least one pair of threads is offset at an angle comparable to the angle of the spring coil at rest so that the keeper element makes contact with the spring coil at the at least two positions.

15. The method of claim 11, wherein the position of the keeper element within the internal profile is chosen to adjust the tension of the spring.

16. The method of claim 11, wherein selection of a thread for placement of the keeper element closer to the diaphragm increases the tension on the spring.

* * * * *